Patented July 14, 1931

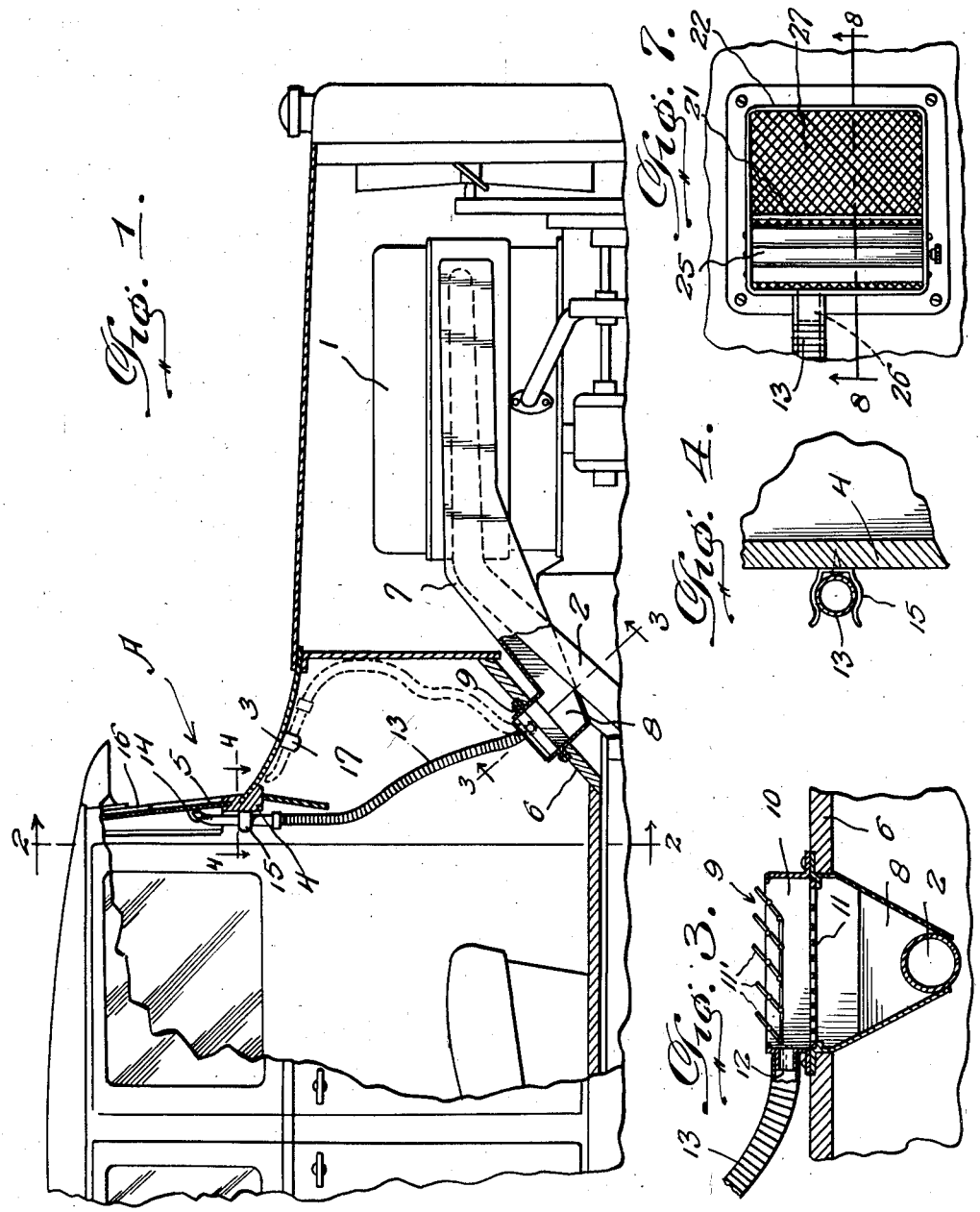

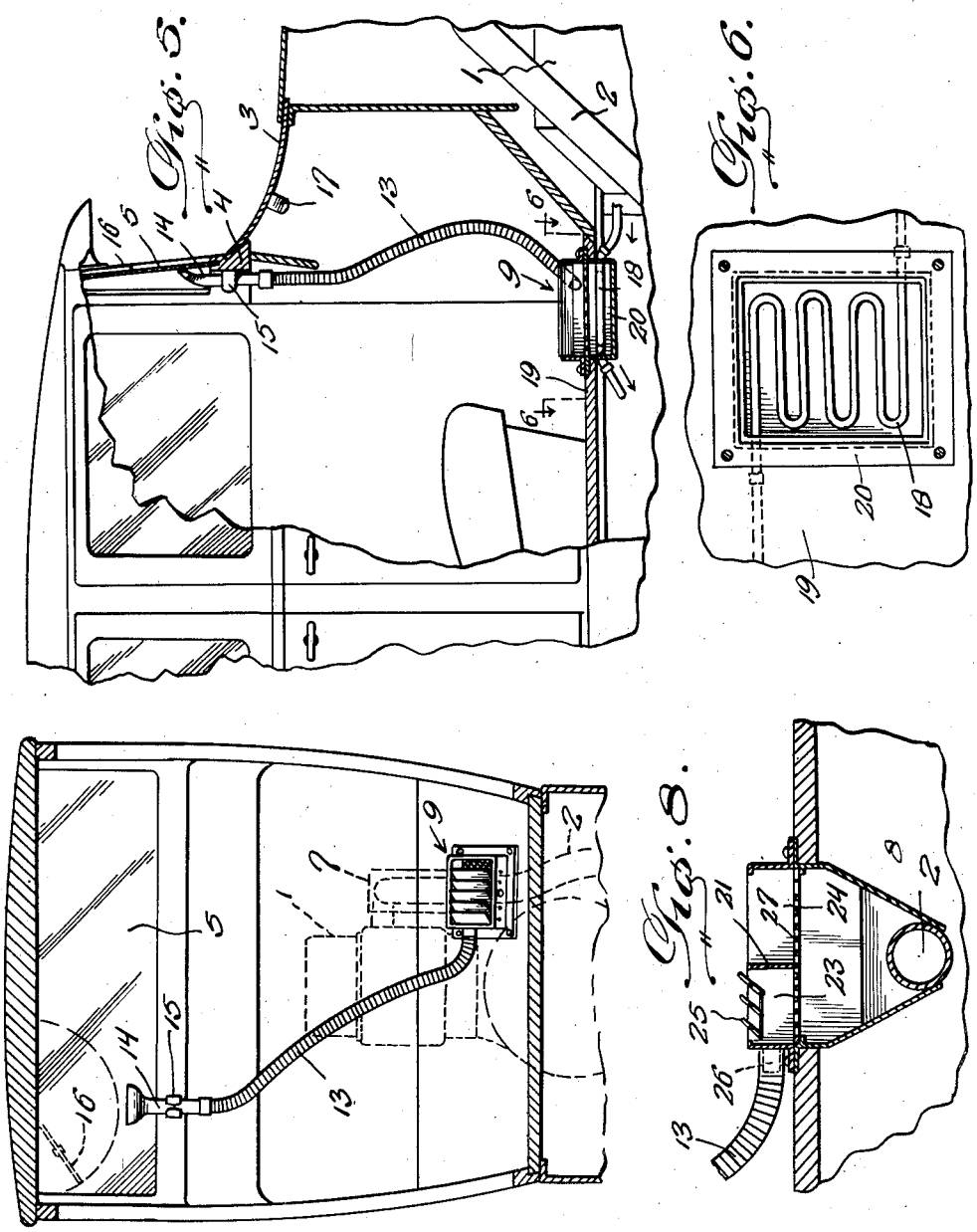

1,814,039

UNITED STATES PATENT OFFICE

CHARLES E. HEYDON, JR., OF NAPERVILLE, ILLINOIS

ATTACHMENT FOR MOTOR VEHICLES

Application filed March 10, 1930. Serial No. 434,623.

The present invention relates to improvements in attachments for motor vehicles and has reference more particularly to a combination car and windshield heater structure.

One of the important objects of the present invention is to provide an attachment of the above-mentioned character wherein a blast of heated air is directed against the inner surface of a windshield panel for the purpose of preventing ice, snow and sleet from forming thereon thereby permitting a conventional windshield wiper to properly function so that the driver will have a clear and unobstructed view.

Another important object of the invention is to provide an attachment of the above-mentioned character whereby the interior of the vehicle can be heated simultaneously with the functioning of the windshield heater, means being provided for controlling the supply of heat to the interior of the car as well as to the conduit having the heated air discharge nozzle associated therewith.

Still another important object of the invention is to provide a structure of the above-mentioned character that can be readily and easily installed without necessitating any material alterations, the device being at all times positive and efficient in its operation as well as simple in construction and strong and durable.

Other objects and advantages of the present invention will become apparent from the following description when taken in connection with the accompanying drawings.

In the accompanying drawings wherein like reference characters indicate corresponding parts throughout the several views:

Figure 1 is a sectional view through an automobile showing my attachment installed.

Figure 2 is a vertical sectional view taken approximately on the line 2—2 of Figure 1 looking in the direction of the arrows.

Figure 3 is a sectional view taken substantially on the line 3—3 of the same figure looking in the direction of the arrows.

Figure 4 is a transverse section taken approximately on the line 4—4 of Figure 1 looking downwardly.

Figure 5 is a view similar to Figure 1 showing a slight modification of the heater.

Figure 6 is a transverse section taken approximately on the line 6—6 of Figure 5 also looking downwardly.

Figure 7 is a top plan view of a modification of the radiator structure; and

Figure 8 is a vertical sectional view taken substantially on the line 8—8 of Figure 7.

In the drawings with reference more particularly to Figures 1 to 4 inclusive, the numeral 1 designates generally the internal combustion engine of an automobile A, the exhaust manifold being indicated at 2. The cowl is shown at 3 and the cowl support is indicated at 4. The windshield of the automobile is illustrated generally at 5 while the floor board is designated by the numeral 6.

My attachment includes a housing 7 for disposition around the exhaust manifold 2 for the collection of heated air and the rear end of the housing 7 terminates in the upwardly disposed outlet neck 8 that extends through an opening provided therefor in the floor board 6 as clearly shown in Figure 1.

Secured on the floor board directly over the outlet neck 8 is a heat radiator structure denoted generally by the numeral 9, the same including a rectangularly shaped frame 10 in the bottom of which is arranged the perforated plate 11 while arranged in the upper portion of the frame is a shutter structure 11' that is operable by any appropriate means for closing the open top of the frame when the interior of the car is not to be heated.

A hot air outlet nipple 12 extends from one side of the frame 10 and fitted over this nipple is the lower end of a flexible conduit 13. A hot air discharge nozzle 14 is carried by the upper free end of the conduit 13 and for the purpose of properly supporting the nozzle in an operative position for disposition adjacent the inner surface of the windshield panel, there is provided the retaining clip 15 that is secured at the bottom portion of the windshield 3 in the manner as clearly shown in Figure 4.

When the parts are arranged as shown in Figure 3, the shutter structure 11' is open thereby permitting heated air to be discharged into the interior of the car. At the same time, a portion of the heated air will pass through the conduit 13 and will be discharged against the inner surface of the windshield panel from the nozzle 14 thus heating the windshield and preventing the formation of ice, snow, or sleet thereon, thereby enabling the windshield wiper 16 to properly function.

By adjusting the shutters 11′, the amount of heated air entering the interior of the car may be regulated and obviously by disposing the shutters in an entirely closed position, all of the heated air will be caused to pass through the conduit 13 and through the nozzle 14 and be discharged against the windshield panel.

When it is not desired to use the conduit 13 and the nozzle 14, the nozzle can be disposed in an inoperative position by disengaging the same from the clip 15 and attaching the same to the under side of the cowl 3 by means of a similar clip 17. This is clearly shown in the dotted lines in Figure 1 of the drawings.

In Figures 5 and 6 of the drawings, I have shown a slight modification of the means for heating the air and to this end, a coil 18 is arranged horizontally beneath the floor board 19 within a suitable casing 20, the floor board directly above the casing being open to accommodate the radiator structure 9. The heating medium that flows through the coil 18 may consist of water that is heated by the exhaust pipe in any suitable manner or the exhaust gases may be caused to pass through the coil 18.

Attention is now directed to Figures 7 and 8 of the drawings wherein a slight modification of the radiator structure is illustrated. In this instance, a partition 21 is arranged vertically within the rectangular frame 22 and this will divide the frame into independent compartments designated by the numerals 23 and 24 respectively. The compartment 24 is not provided with any closure means in the upper portion thereof while a shutter structure 25 is arranged in the upper portion of the compartment 23 and also a hot air discharge nipple 26 extends from the side of the compartment 23 for connection with the conduit 13. A perforated plate 27 is arranged in the bottom of the casing 22.

This construction last described provides a means for regulating the amount of hot air that is delivered to the conduit 13 and at the same time permits the interior of the car to be heated.

An attachment of this character can be readily and easily installed on an automobile without necessitating any material alterations and furthermore the device will at all times be positive and efficient in carrying out the purposes for which it is designed.

While I have shown the preferred embodiment of the invention, it is to be understood that minor changes in the size, shape and arrangement of parts may be resorted to without departing from the spirit of the invention and the scope of the appended claims.

What I claim as new is:

1. An attachment for an automobile having a radiator structure, means for supplying heated air thereto, a flexible hot air discharge pipe extending from the radiator structure, a discharge nozzle carried by the free end of the conduit, clip means for removably supporting the nozzle adjacent the windshield of the automobile for directing a blast of heated air against the inner face of the windshield panel, and clip means for removably securing the nozzle in an inoperative position beneath the cowl of the automobile.

2. An attachment for an automobile having a radiator structure, means for supplying heated air thereto, a flexible hot air discharge pipe extending from the radiator structure, a discharge nozzle carried by the free end of the conduit, clip means for supporting the nozzle adjacent the windshield of the automobile for directing a blast of heated air against the inner face of the windshield panel, said radiator structure including a frame, a hot air discharge nipple extending from one side of the frame, and a shutter unit arranged in the upper portion of the frame.

3. An attachment for an automobile having means for supplying heated air to the interior of an automobile, a flexible hot air discharge pipe extending from said heated air supplying means, a discharge nozzle carried by the free end of said hot air discharge pipe, and clip means to selectively support said nozzle in position for directing a blast of heated air against the inner face of the automobile windshield or in an out-of-the-way position beneath the cowl of the automobile.

In testimony whereof I affix my signature.

CHARLES E. HEYDON, Jr.